Patented Jan. 20, 1931

1,789,924

UNITED STATES PATENT OFFICE

JOSEPH BINAPFL, OF KREFELD, AND WILLI KREY, OF UERDINGEN, GERMANY

OXIDATION OF BENZENE COMPOUNDS

No Drawing. Application filed August 29, 1929, Serial No. 389,313, and in Germany September 5, 1928.

The invention relates to the oxidation of benzene compounds and in particular comprises a process of obtaining valuable oxygenated compounds from alkyl benzenes with a side chain connected to two carbon atoms of the benzene nucleus, especially benzo polymethylene compounds by oxidizing them by means of gaseous oxygen or a gas containing oxygen at elevated temperature in the presence of an oxidation catalyst.

As we have set forth in our copending application Serial No. 242,284, filed December 23, 1927, those alkyl benzenes possessing two or more carbon atoms in the side chain can be converted to oxygenated compounds, chiefly alcohols and ketones by reacting upon said hydrocarbons with gaseous oxygen or gases containing oxygen at elevated temperature above 50° C. in the presence of an oxidation catalyst.

The present invention represents a further development and in accordance therewith we have found that the oxidation process described in the aforesaid patent is not restricted to those alkyl benzenes having an open side chain of two or more carbon atoms but that those benzene compounds the side chain of which is connected with two carbon atoms of the benzene nucleus thus forming a second ring will be converted to valuable oxygenated products by treating them in liquid phase with gaseous oxygen or gases containing oxygen at a temperature above 50° C. in the presence of an oxidation catalyst. In particular benzo polymethylene compounds such as hydrindene, tetrahydronaphthalene and the substitution products thereof preferably those compounds having a free α-position in the alicyclic ring are readily oxidized to alcohols and ketones.

The oxidation catalysts employed may be of different kinds. Preferably the oxides and hydroxides of heavy metals have given excellent results and in some cases the corresponding metals are operative. The state of division of the oxidation catalyst is, however, of great importance, since a more finely divided catalyst offering a large surface area exerts an increased oxidizing action. Inter alia the finely divided oxides of copper, iron and nickel have proved particularly efficacious. The oxidation catalysts may be used singly or mixed with one another or they may be precipitated upon an inert substance or carrier, such as pumice, calcium carbonate silica gel or the like.

The temperature of the reaction may vary, say, from about 50° C. to the boiling point of the compound to be oxidized; depending in each case upon the respective oxidation catalyst used. As already stated, a typical feature of the invention consists in oxidizing the compounds in the liquid phase.

The oxidation always takes place at that carbon atom of the alicyclic ring attached to the benzene nucleus in the alpha position; in accordance therewith there is preponderantly obtained, for example, from tetrahydronaphthalene α-keto tetrahydronaphthalene in addition to a small amount of α-hydroxy tetrahydronaphthalene. If desired, inert liquid diluents which are not attacked by oxygen may be present during the oxidation process.

One method of carrying out the process consists in introducing the compound to be oxidized and the oxidation catalyst into, for example, a cylindrical vessel of a small diameter and a considerable height provided with a device for admitting in the lower part of the vessel oxygen or gases containing oxygen such as air. The current of air bubbles through the liquid and passes through a condenser, constructed and arranged in such a manner that the water formed during the reaction is continuously separated. When oxidation has proceeded to the desired extent, the unchanged starting material is distilled off after having removed the catalyst, and the remaining oxidation products are isolated by fractional distillation in a high vacuum.

The invention is illustrated by the following examples, but not limited thereto. The parts are by weight.

Example 1

An oxidation catalyst is prepared by precipitating a 20 percent of copper sulfate containing aqueous solution by means of an excess of a caustic soda solution at room temperature, decanting, filtering, washing and drying the precipitate at about 100° C. 20 parts of this catalyst are added to 2000 parts of tetrahydronaphthalene in a high cylindrical iron vessel of a small diameter and air is passed through the mixture at about 80 to 90° C. According to the layer of liquid and the velocity of the current the air leaves the mixture with a content of oxygen varying between 0 and 4 percent. When about 50 litres of oxygen are absorbed by every kilogram of tetrahydronaphthalene, absorption comes to a standstill whilst about 70 parts of water distil in the course of the reaction. By distilling off the unchanged tetrahydronaphthalene a residue remains which yields about 600 parts of oxidation products boiling from 130 to 135° C. under a pressure of 15 mm. and consisting of 80 percent of α-keto tetrahydronaphthalene and 20 percent of α-hydroxy tetrahydronaphthalene, besides some 1.2 dihydronaphthalene produced from the hydroxy tetrahydronaphthalene during distillation.

Example 2

20 parts of the oxidation catalyst prepared according to Example 1 are added to 1000 parts of ar-ethyl tetrahydronaphthalene (prepared in accordance with U. S. Patent 1,766,344 of June 24, 1930 to Michel application Serial No. 268,363, filed April 7, 1928, by reacting with ethylene upon tetrahydronaphthalene in the presence of an aluminum halide) and oxygen is introduced into the mixture for some 56 hours. During this time 50 parts of water are produced. After distilling off the unchanged tetrahydronaphthalene there are obtained at a pressure of 30 mm. 300 parts of liquid oxidation products which consist of 75 percent of a ketone and of 25 percent of the corresponding secondary alcohol and which readily dissolve nitrocellulose. A slight residue is left in the still. The ketone is believed to be an ar-ethyl α-keto tetrahydronaphthalene. By mixing it with semi-carbazide hydrochloride in an aqueous-alcoholic solution it is converted to a semicarbazone recrystallizable from toluene and melting at 223° C.

Example 3

20 parts of the oxidation catalyst in accordance with Example 1 are added to 2000 parts of ar-chloro tetrahydronaphthalene boiling from 120 to 130° C. at 15 mm. pressure (prepared by chlorinating tetrahydronaphthalene at a low temperature in the presence of a chlorination catalyst such as anhydrous ferric chloride). The mixture is treated at about 100° C. with oxygen for some 25 hours. During this time 35 parts of water are produced. After distilling off the unchanged chloro tetrahydronaphthalene there are obtained 300 parts of liquid oxidation products boiling at about 160° C. under 20 mm. pressure which are soluble in concentrated sulfuric acid for about 75 percent. They consist of a mixture of a chlorinated α-keto tetrahydronaphthalene and the corresponding alcohol and are good solvents for nitro cellulose. In an aqueous-alcoholic solution the ketone is converted by semicarbazide hydrochloride to a semicarbazone recrystallizable from cyclohexanol and melting at 219° C., which is insoluble in water and slightly soluble in alcohol, benzene and tetrahydronaphthalene.

Example 4

700 parts of tetrahydronaphthalene are dissolved in 1300 parts of chlorobenzene and mixed with 20 parts of the oxidation catalyst in accordance with Example 1. The mixture is treated at about 100° C. with oxygen for some 15 hours. After distilling off the chlorobenzene and unchanged tetrahydronaphthalene there are obtained 300 parts of α-keto tetrahydronaphthalene containing about 20 percent of α-hydroxy tetrahydronaphthalene.

Example 5

An oxidation catalyst is prepared by precipitating at room temperature, a 10 percent solution of potassium chromium sulfate, by means of the calculated amount of aqueous ammonia having a strength of 10 to 20 percent, decanting, filtering and drying the precipitate at about 100° C. 20 parts of the hydrated chromium oxide thus obtained and sifted afterwards are added to 2000 parts of tetrahydronaphthalene; the mixture is subjected to a vigourous current of oxygen at 85 to 125° C. in a cylindrical iron vessel having a small diameter and a large height for some 3 to 5 hours. The water produced during this time is allowed to continuously distil off. The reaction product filtered from the catalyst yields after distilling off the unchanged tetrahydronaphthalene some 600 to 700 parts of oxidation products from which α-keto tetrahydronaphthalene (containing a little amount of α-hydroxy tetrahydronaphthalene) may be separated by fractional distillation at extremely reduced pressure.

Example 6

A 30 percent caustic soda solution is added to a 10 percent of manganese sulfate containing solution until the liquid shows an alkaline reaction. The precipitate is decanted, filtered and dried at about 100° C. 20 parts of the manganese oxide thus obtained are finely pulverized, mixed with 2000 parts of tetrahydronaphthalene and treated with a current of oxygen as shown in Example 5 at a temperature of 85 to 130° C. During this time about 70 parts of water are produced and distil off. After filtering the catalyst 600 to 700 parts of oxidation product are obtained.

A following fractional distillation in a high vacuum yields a mixture of 80 per cent of α-keto tetrahydronaphthalene and 20 percent of α-hydroxy tetrahydronaphthalene.

*Example 7*

A 10 percent of nickel sulfate containing solution is precipitated by means of a 10 percent caustic soda solution at room temperature until the liquid shows an alkaline reaction, decanted, filtered and dried at about 100° C. 20 parts of the nickel oxide thus obtained are finely pulverized, and added to 2000 parts of tetrahydronaphthalene. The mixture is oxidized in accordance with Example 5. There are obtained about 600 parts of oxidation products which yield about 500 parts of α-keto tetrahydronaphthalene (in addition to some α-hydroxy tetrahydronaphthalene) on distillation in a high vacuum.

If the oxidation temperature rises too high or the distillation of the oxidation products is not carried out under extremely reduced pressure, the α-hydroxy tetrahydronaphthalene present in the mixture readily splits off water and is converted to 1.2 dihydronaphthalene.

We claim:

1. The process which comprises reacting upon an alkyl benzene with a side chain connected with two carbon atoms of the benzene nucleus, in liquid phase with a gas containing oxygen at a temperature above 50° C. in the presence of an oxidation catalyst.

2. The process which comprises reacting upon a benzo polymethylene compound in liquid phase with a gas containing oxygen at a temperature above 50° C. in the presence of an oxidation catalyst.

3. The process which comprises reacting upon a benzo polymethylene compound in liquid phase with a gas containing oxygen at a temperature above 50° C. in the presence of an inorganic oxidation catalyst.

4. The process which comprises reacting upon a benzo polymethylene compound in liquid phase with a gas containing oxygen at a temperature above 50° C. in the presence of an inorganic oxidation catalyst comprising a compound of a heavy metal.

5. The process which comprises reacting upon a benzo polymethylene compound in liquid phase with a gas containing oxygen at a temperature above 50° C. in the presence of an inorganic oxidation catalyst comprising a heavy metal oxide.

6. The process which comprises reacting upon a benzo polymethylene compound in liquid phase with a gas containing oxygen at a temperature above 50° C. in the presence of finely divided cooper oxide.

7. The process which comprises reacting upon tetrahydronaphthalene in liquid phase with a gas containing oxygen at a temperature not below 80° C. in the presence of an inorganic oxidation catalyst comprising a heavy metal oxide.

8. The process which comprises reacting upon tetrahydronaphthalene with air at a temperature of about 80 to 90° C. in the presence of finely divided copper oxide.

9. The process which comprises reacting upon a benzo polymethylene compound with a gas containing oxygen at a temperature above 50° C. in the presence of an oxidation catalyst comprising a heavy metal oxide, and an inert diluent.

In testimony whereof, we affix our signatures.

JOSEPH BINAPFL.
WILLI KREY.